July 25, 1944.   J. K. RUSSELL   2,354,481
FILTER SHELL
Filed Oct. 5, 1942
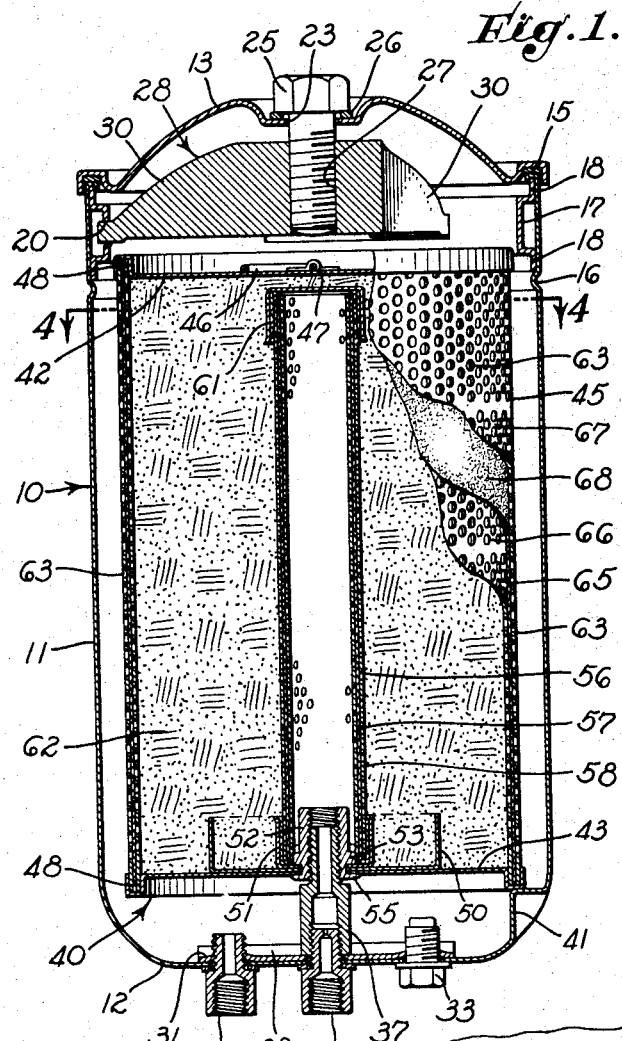
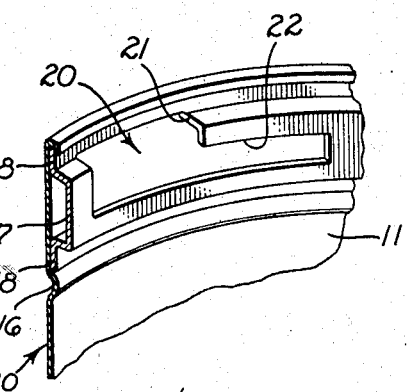
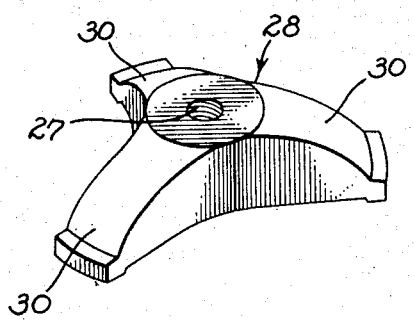
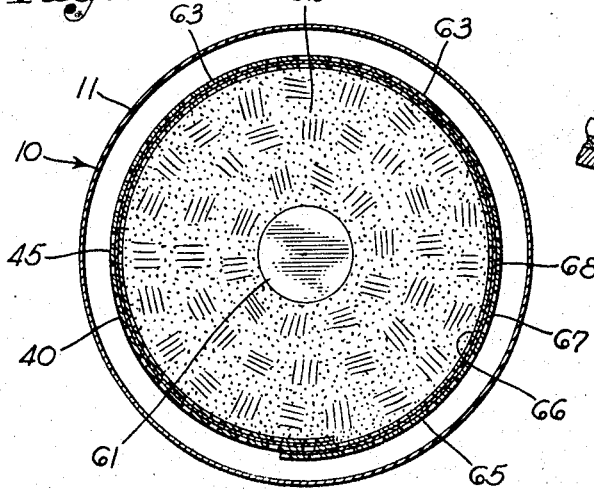
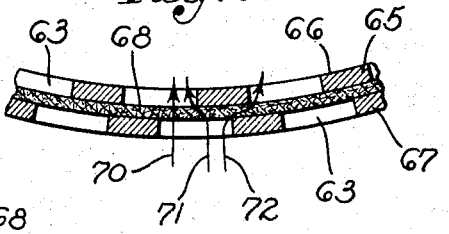
INVENTOR
JOHN K. RUSSELL
BY
HARRIS, KIECH, FOSTER & HARRIS
FOR THE FIRM
ATTORNEYS.

Patented July 25, 1944

2,354,481

UNITED STATES PATENT OFFICE 2,354,481

FILTER SHELL

John K. Russell, Los Angeles, Calif., assignor to Luber-Finer, Inc., Los Angeles, Calif., a corporation of California Application October 5, 1942, Serial No. 460,896

7 Claims. (Cl. 210—169)

My invention relates to filter devices, particularly devices for filtering liquids, and is directed specifically to the construction of a shell to serve as a filtering wall. The invention is being initially applied to the construction of a filter element for service in the lubricating system of an automotive engine and will be so described for the purpose of the present disclosure.

A filtering system of the type under consideration, for use in automobiles for example, includes a permanent metal housing through which at least a portion of the engine lubricating oil is continuously passed for filtering action. Inside the permanent housing is mounted a filter pack or element, the arrangement being such that the flowing oil is subject to filter action both by the cylindrical wall of the filter element and by filter material contained in the element. The filter element may be renewable or replaceable in whole or in part. The present construction is directed to the construction of such a filter element with special reference to the construction of the filtering shell or outer wall.

It is one object of my invention to provide a simple but efficient filtering shell that is inexpensive to manufacture and is adapted for mass production. It is another object of the invention to provide a filtering shell at such low cost that the whole filter element, of which the shell is a part, may be discarded entirely and economically replaced by an entirely new filter element at the end of a normal period of service. Another object of the invention is to provide a filtering shell that may be manufactured with minimum use of metals or other materials that are relatively expensive or relatively difficult to attain, especially in wartime.

The contemplated filtering shell must have sufficient strength and rigidity to serve as the side wall of the filter element, must be so constructed as to perform the desired filtering function, and moreover, must provide a flow capacity adequate for the desired rate of oil flow. Since the filter element is to be discarded after a period of service, both the material of the cylindrical filtering shell and the method of fabricating the shell must be inexpensive. My preferred construction meets these requirements and in addition meets the problem of minimizing the use of scarce materials.

I have discovered that a suitable shell may be fabricated by using non-metallic perforated sheet material in combination with a sheet of filtering material, more than one layer of the perforated sheet being employed to obtain the desired strength and rigidity. I have further discovered that perforated cardboard or thick paper that is suitably oil-resistant may be used, and have found that two or more layers of such perforated paper provide adequate strength for the side wall of the filter element and adequate support for the associated sheet of filtering material.

One of the problems it is my purpose to solve in the preferred practice of the invention is that of providing for sufficient flow-openings through a dual layer perforate wall. For economy in manufacture the sheets of oil-impervious paper must be perforated before being formed to cylindrical configuration, but if such sheets are pre-perforated the problem arises of how to insure proper registration or overlap of the perforations of the two layers. Superimposing two perforated sheets indiscriminately may provide either a very small total area of overlapping apertures or may result in substantial registration of the apertures of both sheets. It is my object to provide a method of superimposing one perforated sheet on another in the manufacture of a filtering shell that may be carried out with rapidity and with no care for registration of apertures and yet will result in substantially a predetermined total area of aperture overlap.

It is another object of my invention to provide a filtering shell that will afford an effective filtering action. It is one of my purposes to provide both extensive areas on the wall of the filter pack in which the oil flow through the filtering wall is substantially radial or normal thereto and at the same time to provide extensive areas in which the filter flow through the wall is non-radial.

In the preferred practice of my invention I have the specific object of providing sufficient areas of radial flow of relatively low flow-resistance adequate for the contemplated rate of flow of oil through the filter housing, it being contemplated that initial flow will be largely radial, non-radial flow along the paths of greater resistance increasing as the paths of radial flow become increasingly clogged by filtrate.

The above and other objects and advantages of my invention will be apparent from the detailed description to follow, taken with the accompanying drawing.

In the drawing, which is to be considered as illustrative only:

Fig. 1 is a sectional view of filtering apparatus for an automobile incorporating my invention, fragments of my filtering shell being shown in side elevation;

Fig. 2 is a perspective view of a spider employed in the permanent housing shown in Fig. 1;

Fig. 3 is a fragmentary perspective view of the inner surface of the upper portion of the housing;

Fig. 4 is a transverse section taken as indicated by the line 4—4 of Fig. 1;

Fig. 5 is a development of a strip of the filtering shell shown on an enlarged scale; and Fig. 6 is an enlarged portion of Fig. 5.

The drawing shows a permanent filter housing generally designated 10 of a well-known type commonly employed for purifying the oil in the lubricating system of an internal combustion engine. The filter housing 10 has a cylindrical side wall 11, a bottom wall 12 unitary therewith and is fitted with a cover 13 having a sealing gasket 15.

Formed in the cylindrical side wall 11 is an inwardly presented rib 16, immediately above which is a latching ring 17. The latching ring 17 is of U-shaped configuration providing two cylindrical flanges 18 for anchorage to the surrounding cylindrical wall 11 of the housing 10. The latching ring 17 is cut away from above to provide three circumferentially spaced bayonet slots 20 best shown in Fig. 3, each bayonet slot having an entrance 21 and a latching portion 22.

The cover 13 has an axial opening 23 through which extends a suitable threaded member such as a cap screw 25, there being a suitable packing ring or gasket 26 for sealing action between the head of the cap screw and the outer surface of the cover. The cap screw is threaded into the threaded axial bore 27 of a suitable spider 28 having three latching legs 30 corresponding to the three bayonet slots 20. Since the latching ring 17 is permanently united with the cylindrical side wall 11 of the filter housing 10, it is apparent that the spider 28 may be engaged with the bayonet slots 20 and the cap screw 25 tightened to close the filter housing 10 in a substantially liquid-tight manner.

The bottom wall 12 of the filter housing 10 is preferably reinforced by a plate 31 having upwardly turned reinforcing flanges 32. Extending through both the bottom wall 12 and the reinforcing plate 31 is a drain plug 33, a threaded inlet fitting 35 and a central threaded outlet fitting 36, which outlet fitting carries an upwardly extending nipple 37 on its inner end. Mounted on the nipple 37 is a filter element generally designated 40 to which the present invention especially refers. A number of indentations 41 may be made in the side wall of the filter housing 10 to form multiple supports for the bottom of the filter element 40 as indicated in Fig. 1.

While I prefer to use with my filter element the described filter housing 10, it will be readily understood that any other type of construction of filter housing may be employed in various practices of my invention.

The filter element 40 has an imperforate top wall 42, an imperforate bottom wall 43, and a perforate cylindrical side wall or filtering shell 45. The top wall 42 may be fabricated from sheet metal or suitable plastic and preferably is provided with a suitable bale or handle 46 pivotally mounted in a small bracket 47. The top wall 42 may be united with the filtering shell 45 in any suitable manner. In the present construction the circumferential margin of the top wall is formed to a U-shaped cross-sectional configuration to provide an annular recess 48 to receive the upper end of the filtering shell 45.

The imperforate bottom wall 43 of the filter element may be of the same material as the top wall and in like manner may provide an annular recess 48 to seat the lower end of the filtering shell 45. On the inner face of the bottom wall 43 is seated a cup 50 and inside the cup is an upwardly presented cap 51, the cup and cap being made of suitable thin-walled material. A threaded outlet fitting 52 extends through the three layers of material provided by the bottom wall 43, the cup 50, and the cap 51, the three layers of material being securely gripped between an annular shoulder 53 on the circumference of the outlet fitting and a radial flange 55 on the lower end of the outlet fitting. Such a radial flange 55 may be formed by a spinning or swaging operation. The outlet fitting 52 is suitably threaded for engagement with the previously mentioned nipple 37 as best shown in Fig. 1, the arrangement being such that the filter element 40 is supported both by the nipple and by the indentations 41.

The numeral 56 generally designates a filter tube or means for receiving filtered liquid for flow to the outlet fitting 52. Such a filter tube 56 may be constructed in any suitable manner to hold back solid material, but permit relatively free flow of liquid. In my preferred construction the filter tube 56 comprises one or more layers 57 of cheesecloth or like material and one or more layers 58 of perforate sheet material. An upper cap 61 is pressed upon the upper end of the filter tube 56 and the lower end of the filter tube is pressed into the seat provided by the lower cap 51. Preferably, the filter element 40 is filled with a suitable filter meduim 62 surrounding the filter tube 56. The filter medium 62 may consist of clay, fiber, or other materials known to the art.

In normal operation of the filter system, oil entering the housing 10 through the inlet fitting 35 surrounds the filter element 40, passes through the filtering shell 45, the filter medium 62, and the wall of the filter tube 56, to flow downward and outward through the nipple 37 and the outlet fitting 36.

In my preferred procedure for fabricating a cylindrical filtering shell 45 having a diameter of approximately 5", I employ what is known as tag board approximately 1/32" thick. This well-known sheet material is a processed paper with a glossed surface and is what may be termed oil-resistant, since it will retain its form and strength over a prolonged period of contact with oil. I provide a sheet of the oil-resistant paper approximately twice the circumference of the contemplated filtering shell, punch the sheet to provide substantially uniformly spaced perforations 63, and then roll the perforated sheet spirally on itself for substantially two turns to form a cylinder of the desired diameter. A feature and advantage of this procedure is that the changing diameter caused by the spiral configuration results in progressive overlap of the perforations of the two turns of sheet material. If the circumferential progression of the perforations of one turn of the sheet relative to the perforations of the other turn of the sheet is such that a range from substantially no registration of perforations to substantially full registration of the perforations corresponds to the circumference of the cylinder, and if the perforations are so spaced that a perforation in one turn of the sheet cannot overlap simultaneously two perforations in the other turn of the sheet, the total area unmasked by overlapping of perforations will be substantially half the total area of the perforations of one turn of the sheet, since the average overlap will be approximately one-half. If the range of progression from minimum overlap to maximum overlap is one-half, one-fourth, or any even part of the circumference, the total area unmasked will likewise be approximately one-half of the total area of perforations in one turn of the sheet. If the perforations are so spaced that a perforation in one turn of the sheet may overlap simultaneously two perforations in the other turn the ratio of unmasked area to masked area will be increased by an amount that may be readily estimated.

In my preferred practice the range of progression from minimum overlap to maximum overlap is approximately one-fourth of the circumference and one perforation in one turn may overlap the perforations in the other turn. Prior to rolling the perforated sheet I superimpose on one side thereof a layer of filtering material, for example, a sheet of suitable filter paper, the length of the layer being approximately equal to the circumference of the contemplated cylindrical shell. I then roll the perforated sheet with the superimposed filter sheet to the spiral configuration, thereby forming two layers of the perforated material with the sheet of filter paper sandwiched therebetween. Preferably sufficient material of the two sheets is provided to permit overlap of the ends as required for structural strength and filtering efficiency. The filtering shell thus formed is assembled to the previously described bottom wall 43; the filter tube 56 with its upper cap 61 is mounted on the bottom wall 43; the filter medium 62 is then placed inside the filter shell 45; and then the upper wall 42 is assembled to the filter shell to complete the filter unit. Fig. 1 shows the completed filter unit in place and shows a spirally wound perforated sheet 65 with the perforations 63, the sheet being rolled to two turns forming an inner turn or layer 66 and an outer turn or layer 67, the two turns supporting and holding in place the intermediate sheet 68 of filter paper.

The manner in which the perforations of the two turns of the spirally wound perforated sheet 65 progressively overlap is indicated by Figs. 4, 5, and 6. In Fig. 5 the circles in solid lines are perforations in one turn of the perforated sheet 65, the dotted circles represent perforations in the other turn of the sheet, and the shaded areas are the areas of overlap of perforations.

It is contemplated that the total unmasked area, i. e., the total area of overlap of perforations in the two turns or layers 66 and 67 will be adequate initially for handling the desired rate of flow, and since the path of least resistance of the liquid is radially through the intermediate filter sheet 68, initial filter flow when the filter unit is first placed in operation will be, for the most part, directly inward through the unmasked portions of the perforations 63. In the course of continued filtering operation, however, the intermediate filtering layer 68 becomes increasingly clogged with foreign matter, especially the areas on the outer surface of the filter sheet exposed by perforations in the outer turn of the turn of the perforated sheet 65. As such clogging progressively increases with resultant increase in resistance to simple radial flow non-radial flow progressively increases but with very little reduction in total flow. Arrow 70 in Fig. 6 indicates a path of simple radial flow; arrow 71 indicates a path of non-radial flow that is followed when clogging substantially reduces direct radial flow; and arrow 72 indicates a type of filtering flow that may occur after substantial clogging has occurred. Arrow 72 represents a condition in which the exposed areas on the intake side of the filter layer 68 are clogged to such an extent that oil is forced to flow along the inner face of the outer perforated layer 67 to reach a lesser clogged portion of the filter sheet. Since the intermediate filter sheet 68 is merely imprisoned by the two perforated layers 66 and 67, and is not directly bonded to the two layers, the type of flow indicated by the arrow 72 is facilitated.

While I have described the filtering shell 45 as formed of the sheet 65 in two layers or turns 66 and 67, my invention contemplates the provision of the sheet 65 of greater length to provide more than two layers or turns, particularly when the diameter of the filter shell is greater than five inches, and also when the diameter of the filtering shell is five inches or less and greater resistance to deformation of the filter shell is desired. Likewise, while the perforations 63 in the sheet 65 are illustrated in the drawing as circular in form, my invention contemplates perforations of any desired shape, for example, elongated slots which may be provided with their axes circumferentially disposed of the shell 45 or inclined with respect to the circumference of the shell 45. I have found that diagonal slots approximately one-eighth inch by three-eighths inch may be effectively employed in the formation of a filter shell 45 of approximately five inches diameter.

As hereinbefore described and as illustrated in the drawing, the filter tube 56 terminates below the top wall 42 of the filter element 40 and is secured only to the bottom wall 43. It is within the scope of my invention to secure the filter tube 56 to both the top wall 42 and the bottom wall 43, or to only the top wall 42, and to cause the filter tube 56 to communicate with the exterior of the filter element 40 through the top wall 42 instead of the bottom wall 43, or to communicate with the exterior of the filter element 40 through both the top wall 42 and the bottom wall 43.

The preferred practice and embodiment of my invention set forth herein for the purpose of disclosure are to be considered as illustrative only. It will be apparent to those skilled in the art that various changes and substitutions may be made under my inventive concept, and I reserve the right to all such departures from my description that lie within the scope of my appended claims.

I claim as my invention:

1. A filter shell for use in a lubricating system, comprising: a sheet of oil-proof paper rolled to turns of a spiral to form multiple layers of a cylindrical wall, there being sufficient turns to make the wall self-supporting; and fibrous filter material in sheet form interposed between layers of said wall, said layers being perforated to permit flow through said filter material.

2. A filter shell for use in an oil purifier housing of a lubricating system, comprising: a sheet of substantially oil-proof paper rolled to turns of a spiral to form the inner and outer layers of a cylinder; and a sheet of filter material interposed between said inner and outer layers, said sheet of oil-proof paper having numerous perforations substantially uniformly spaced circumferentially so that the progressive change in diameter resulting from the spiral curvature of the oil-proof paper causes progressively varying overlap of the perforations of the inner and outer layers of the cylindrical wall.

3. A filter shell for use at a given rate of filter flow in an oil purifier housing of a lubricating system, comprising: a sheet of substantially oil-proof paper rolled to two turns of a spiral to form the inner and outer layers of a cylinder; and a sheet of filter material interposed between said inner and outer layers, said sheet of oil-proof paper having numerals perforations substantially uniformly spaced circumferentially so that the progressive change in diameter resulting from the spiral curvature of the oil-proof sheet causes progressively varying overlap of the perforations of the inner and outer layers of the cylindrical wall, the diameter, number, and spacing of said perforations being such that the total area of overlap of the perforations of the two layers permitting simple radial flow through the cylindrical wall is adequate for said given rate of filter flow.

4. A method of fabricating a cylindrical filter shell, which comprises: perforating a sheet of oil-proof material having a width equal to the axial length of the desired shell and a length in excess of twice the circumference of said shell; placing a sheet of filtering material on the back of said sheet of oil-proof material, said sheet of filtering material having a width sufficient to cover the edge perforations in said oil-proof material and a length less than that of the sheet of oil-proof material by an amount equal to approximately the circumference of the finished shell; and rolling said sheets into spiral form to form a cylinder of the desired size, the outer surface of which is wholly made up of said oil-proof material.

5. A method of fabricating a cylindrical filter shell, which comprises: perforating a sheet of oil-proof material having a width equal to the axial length of the desired shell and a length in excess of twice the circumference of said shell; placing a sheet of filtering material on the back of said sheet of oil-proof material, said sheet of filtering material having sufficient length and width to cover all perforations exposed on the outer surface of the finished cylindrical shell; and rolling said sheets into spiral form to form a cylinder of the desired size, the outer surface of which is wholly made up of said oil-proof material.

6. A method of fabricating a cylindrical filter shell, which comprises: perforating a sheet of oil-proof material having a width equal to the axial length of the desired shell and a length in excess of twice the circumference of said shell; placing a sheet of filtering material on the back of said sheet of oil-proof material, said sheet of filtering material having a width sufficient to cover the edge perforations in said oil-proof material and a length less than that of the sheet of oil-proof material by an amount equal to approximately the circumference of the finished shell; and rolling said sheets into spiral form to form a cylinder of the desired size, the outer and inner surfaces of which are wholly made up of said oil-proof material.

7. A method of fabricating a cylindrical filter shell, which comprises: perforating a sheet of oil-proof material having a width equal to the axial length of the desired shell and a length in excess of twice the circumference of said shell; placing a sheet of filtering material on the back of said sheet of oil-proof material, said sheet of filtering material having sufficient length and width to cover all perforations exposed on the outer surface of the finished cylindrical shell; and rolling said sheets into spiral form to form a cylinder of the desired size, the outer and inner surfaces of which are wholly made up of said oil-proof material.

JOHN K. RUSSELL.